US007555900B1

(12) United States Patent
Vallance et al.

(10) Patent No.: US 7,555,900 B1
(45) Date of Patent: Jul. 7, 2009

(54) LINEAR ACTUATOR USING SHAPE MEMORY WIRE WITH CONTROLLER

(75) Inventors: Robert Ryan Vallance, South Riding, VA (US); Bruce L. Walcott, Lexington, KY (US); James E. Lumpp, Lexington, KY (US); Aravind Balasubramanian, Lexington, KY (US); Osamah A. Rawashdeh, Lexington, KY (US)

(73) Assignee: The University of Kentucky Research Foundation, Lexington, KY (US)

( * ) Notice: Subject to any disclaimer, the term of this patent is extended or adjusted under 35 U.S.C. 154(b) by 1016 days.

(21) Appl. No.: 10/659,406

(22) Filed: Sep. 10, 2003

Related U.S. Application Data

(60) Provisional application No. 60/409,460, filed on Sep. 10, 2002.

(51) Int. Cl.
*F01B 29/10* (2006.01)
(52) U.S. Cl. ............................................ 60/528; 60/529
(58) Field of Classification Search ............ 60/527–529
See application file for complete search history.

(56) References Cited

U.S. PATENT DOCUMENTS

| | | | | |
|---|---|---|---|---|
| 4,761,955 | A * | 8/1988 | Bloch ........................... | 60/528 |
| 5,079,920 | A * | 1/1992 | Whitehead et al. ............ | 60/527 |
| 5,749,533 | A * | 5/1998 | Daniels ....................... | 242/287 |
| 6,216,779 | B1 * | 4/2001 | Reinhardt ..................... | 166/57 |
| 6,374,608 | B1 * | 4/2002 | Corris et al. .................. | 60/528 |
| 6,453,669 | B2 * | 9/2002 | Kennedy et al. .............. | 60/527 |
| 6,574,958 | B1 * | 6/2003 | MacGregor ................... | 60/527 |
| 6,762,515 | B2 * | 7/2004 | Gummin et al. ............... | 310/12 |
| 7,017,345 | B2 * | 3/2006 | Von Behrens et al. ......... | 60/527 |
| 7,117,673 | B2 * | 10/2006 | Szilagyi ....................... | 60/528 |

OTHER PUBLICATIONS

Dinalloy, Inc. Technical Characteristics of FLEXINOL actuator wires.
C. Liang et al. Design of Shape Memory Alloy Actuators. Journal of Mechanical Design. Jun. 1992. vol. 114. pp. 223-230.
C. Liang et al. One-Dimensional Thermomechanical Constitutive Relations for Shape Memory Materials. Apr. 1990, J. of Intell. Mater. Syst. and Struct. vol. 1, pp. 207-234.

* cited by examiner

*Primary Examiner*—Hoang M Nguyen
(74) *Attorney, Agent, or Firm*—King & Schickli, PLLC

(57) ABSTRACT

A linear actuator is provided, comprising a housing defining an interior channel, a stop extending from the housing and displaceable relative to the housing, and at least one wire formed of a shape-memory alloy, the wire being attached at a first end to the stop and at a second end to the housing. When heated to a predetermined temperature, the wire applies a pulling force to the stop to cause the stop to slide in a first direction into the housing interior channel. A spring located in the housing interior channel applies a biasing force to the stop in a second direction counter to the first direction when the wire cools, thereby returning the stop to the unactuated position. A wire heater is provided, which may be an electrical source for resistive heating of the wire. Multiple actuators of the present invention may be configured in parallel to increase the force generated by the wires. In yet another embodiment the actuators of the invention may be arranged in a serial configuration for controlling a rotary or carousel dispenser.

22 Claims, 5 Drawing Sheets

LINEAR ACTUATOR USING SHAPE MEMORY WIRE WITH CONTROLLER

This application claims the benefit of U.S. Provisional Patent Application Ser. No. 60/409,460, filed Sep. 10, 2002.

TECHNICAL FIELD

The present invention relates to linear actuators for use in a variety of applications, such as in devices for metered delivery of predetermined doses of drugs. More specifically, the invention relates to an actuator device utilizing a shape memory alloy wire for effecting displacement of a linear actuator.

BACKGROUND OF THE INVENTION

Shape memory alloy (SMA) describes a variety of materials having the common property of contracting much like muscle fibers when heated, for example by application of an electrical current, and which expand to their original length upon cooling. Sheets, fibers, and wires comprised of SMA are therefore useful in numerous applications requiring physical movement in a small space with low to moderate cycling speeds. Advantageously, use of SMA in these applications eliminates or reduces the need for motors or solenoids, reducing weight, complexity, and cost of the resulting devices. For example, fine nickel-titanium (Ni—Ti) wires have been woven into cylindrical shapes for use as vascular stents. The stent is crushed and inserted into the desired position in a blood vessel. Upon warming to above its transformation temperature, the stent returns to the original cylindrical shape and reinforces the walls of the blood vessel.

Other applications for SMA include use as electrical connectors. At ambient temperatures, NiTi rings provide a secure joint for the connector. Chilling the rings causes them to release. In yet another unusual use for SMA, a NiTi spring in coffeepots is able to open a valve and release hot water at the proper temperature to brew a pot of coffee.

It is known also to fabricate various designs of actuators using SMA. Examples of these applications include one-directional actuators used for devices such as SMA cryogenic pipe fittings, bias force actuators, and differential SMA actuators (Liang, C. and Rogers, C. A., 1992. Design of Shape Memory Alloy Actuators. J. Mech. Design 114: 223, incorporated herein in its entirety by reference). Each device utilizes the physical properties of SMA, i.e. that under low temperature the material can be elongated to approximately 4-5% of its original length, and that it will contract that amount when heated. When cooled, if a sufficient biasing force is applied, the SMA will again elongate to approximately 4-5% of its original length.

The present invention provides a novel linear actuator utilizing SMA wire to provide the desired displacement force. The actuator of the present invention is adapted for single use, or may be configured in parallel or in serial orientation in accordance with the anticipated use. In one embodiment, a single actuator having one or more SMA wires may be used to generate a desired application of force. In another embodiment, a plurality of actuators may be configured in parallel and attached to a single plate, thereby providing a displacing force equal to the number of actuators used. In yet another embodiment, at least two actuators may be configured in serial orientation for use with a dispensing device, where it is desired to provide an automated incremental change in position of a dispensing device.

SUMMARY OF THE INVENTION

In accordance with the purposes of the present invention as described herein, in one aspect the present invention provides a linear actuator, comprising a housing, a stop displaceable with respect to the housing, and at least one wire formed of a shape-memory alloy. The wire may be attached at a first end to the stop and at a second end to the housing. It will be appreciated that the wire thus applies a pulling force to the stop when heated to a predetermined temperature, causing the stop to slide in a first direction into the housing interior channel. A spring is provided for applying a biasing force to the stop in a second direction counter to the first direction. The actuator further may include a wire heater.

At least one curved wire guide may be provided on the housing to guide the wire during the heating/cooling steps. It is also desirable to provide at least one means for reducing frictional contact between the wire and the housing. The housing material itself may serve as a bearing to reduce frictional contact with the wire. A separate bearing, such as a bearing defining a channel therethrough for slidingly receiving the wire, may also be provided. This bearing may be fabricated of any material having a suitably low coefficient of friction, such as a jewel bearing fabricated from any of the group consisting of ruby, sapphire, spinel, cubic zirconia, diamond, and any combination thereof.

The actuator may also include a cylindrical shaft extending from the stop into the housing interior channel, the shaft defining a hollow interior adapted to receive the wire therethrough. The shaft may be fabricated from any of the group of materials consisting of stainless steel, aluminum, magnesium, titanium, carbon steel, copper, nickel, carbon-fiber composite, and any combination thereof. It will be appreciated that friction between the wire and the housing will be reduced by interposing therebetween a shaft fabricated of a material having a low coefficient of friction as described above.

Any suitable SMA may be used for the actuator wire, including but not limited to any of the group of shape memory alloys consisting of nickel-titanium, silver-cadmium, gold-cadmium, copper-aluminum-nickel, copper-tin, copper-zinc, copper-zinc-tin, copper-zinc-aluminum, copper-zinc-silica, indium-titanium, nickel-aluminum, iron-platinum, manganese-copper, iron-manganese-silica, and any combination thereof. The wire heater may be any suitable electrical source for applying an electrical current to the wire, thereby providing resistive heating of the wire. The actuator housing may include cooperating slots and protrusions on an exterior surface thereof for providing a more secure connection between at least two actuators in parallel or in series, as will be described below.

In another aspect of the present invention, an actuating device is provided comprising at least two linear actuators configured in a parallel orientation, wherein each actuator is substantially as described above. A plate is provided which is adapted for concurrently attaching to each actuator stop, thereby allowing the linear displacement forces of a plurality of actuators to be applied concurrently to increase the force applied. As described above, an electrical source for applying an electrical current to the wire of each actuator to cause the wire to heat to a predetermined temperature may be provided, thereby concurrently causing each wire to contract.

In yet another embodiment of the present invention, an actuating device is provided, comprising at least two linear actuators as described above configured in a serial orientation. An electrical source is provided for applying an electrical current to heat the wire of each actuator to a predetermined temperature to cause it to contract. There is also provided a controller for causing the electrical source to apply current to predetermined individual applicator wires at predetermined periods of time. Any suitable controller, such as a microcontroller of a type well known in the art, may be utilized. It will be appreciated that this aspect allows incremental applications in force to be applied using a plurality of actuators, which as will be described below provides a mechanism for causing incremental changes (linear or rotary) in position of a supplemental device such as a dispensing chamber.

In one embodiment of the invention, at least two actuators are configured in series and used to control a rotary dispenser. In this embodiment, the dispenser comprises a chamber for holding a plurality of vials containing a substance to be dispensed, a dispensing nozzle, a central hub having a plurality of slots for receiving the actuator stops, a means for rotating the dispenser when the stops are actuated and withdrawn from the central hub slots, and a top. The rotating means may be any suitable device for continuously applying a rotating force to the dispenser, such as a coiled spring or a shaft drive.

Other objects and applications of the present invention will become apparent to those skilled in this art from the following description wherein there is shown and described a preferred embodiment of this invention, simply by way of illustration of the modes currently best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification illustrates several aspects of the present invention and, together with the description, serves to explain the principles of the invention. In the drawing.

Reference will now be made in detail to the presently preferred embodiments of the invention, examples of which are illustrated in the accompanying drawing.

DETAILED DESCRIPTION OF THE INVENTION

Figure 1:
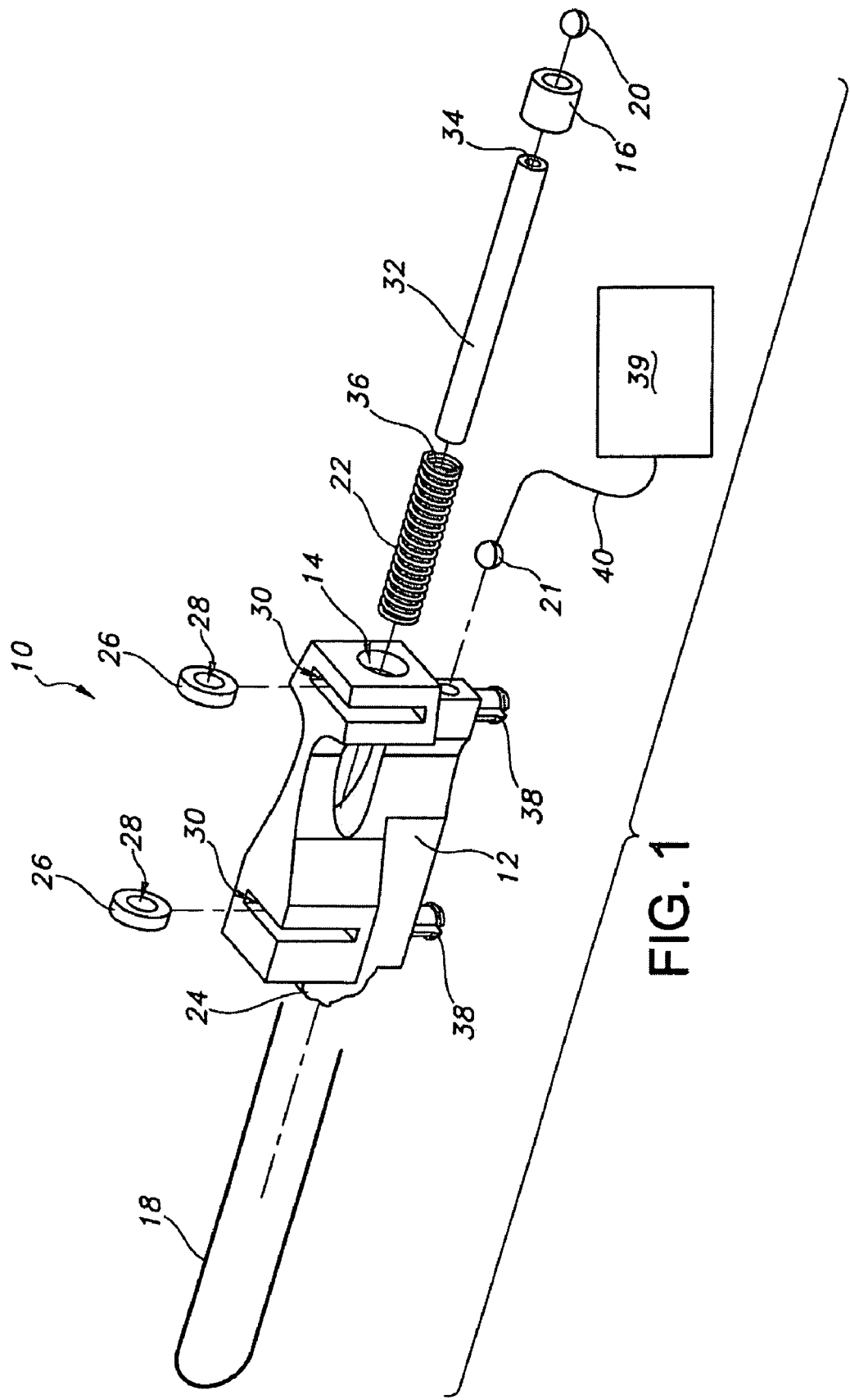
FIG. 1 is an exploded view of the linear actuator of the present invention.

In accordance with the foregoing, the present invention provides a linear actuator utilizing SMA to provide the required displacing force. As shown in FIG. 1, the actuator 10 includes a housing 12 defining an interior channel 14, a stop 16 extending from the housing 12 and adapted for displacement relative to the housing 12, and at least one wire 18 formed of a shape-memory alloy. The wire 18 may be attached at a first end to the stop 16 and at a second end to the housing 12, such as by soldering, welding, or crimping. In the embodiment depicted in FIGS. 1 and 2, wire 18 is terminated at its first and second ends with retainers 20, 21.

A spring 22 located in the housing interior channel 14 applies a biasing force to the stop 16 in a second direction counter to the first direction. At least one curved wire guide 24 may be provided on the housing 12 to guide the wire 18. More than one wire guide 24 may be provided on housing 12, for example when it is desired to fabricate a housing 12 having greater height to width proportions than the actuator 10 depicted in FIGS. 1-2.

Means for reducing frictional contact between the wire and the housing may also be provided. The housing 12 material itself may serve as a bearing to reduce frictional contact with the wire, such as for example ceramic, glass, polymers having the desired properties of heat resistance and low coefficient of friction, and the like. Separate bearings 26, such as a bearing 26 defining a channel 28 therethrough for slidingly receiving the wire 18, may also be provided. Slots 30 in housing 12 may be provided for insertion and removal of bearings 26, such as for replacement of worn components. Bearing 26 may be fabricated of any material having a suitably low coefficient of friction, such as a jewel bearing of a type known in the art, fabricated from any of the group consisting of ruby, sapphire, spinel, cubic zirconia, diamond, and any combination thereof.

The actuator may also include a cylindrical shaft 32 extending from the stop into the housing interior channel 14, the shaft 32 defining a hollow interior 34 adapted to receive the wire 18 therethrough. The shaft 32 may be fabricated from any of the group of materials consisting of stainless steel, aluminum, magnesium, titanium, carbon steel, copper, nickel, carbon-fiber composite, and any combination thereof. In the embodiment shown in FIGS. 1-2, shaft 32 is passed through an interior 36 defined by the coils of spring 22. It will be appreciated that friction between the wire 18 and the housing 12 will be reduced by interposing therebetween a shaft 32 fabricated of a material having a low coefficient of friction as described above. Support legs 38 may also be provided extending from housing 12, for attaching and supporting actuator 10 in proximity to a device to be controlled. In the embodiment shown in FIGS. 1-2, legs 38 are snap-fit prongs of a type known in the art, for inserting into correspondingly sized apertures in a device to which the actuator 10 is to be affixed (not shown).

Any suitable SMA may be used for the actuator wire 18, including but not limited to any of the group of shape memory alloys consisting of nickel-titanium, silver-cadmium, gold-cadmium, copper-aluminum-nickel, copper-tin, copper-zinc, copper-zinc-tin, copper-zinc-aluminum, copper-zinc-silica, indium-titanium, nickel-aluminum, iron-platinum, manganese-copper, iron-manganese-silica, and any combination thereof. In a presently preferred embodiment, nickel titanium wire commercially available as FLEXINOL (Dynalloy, Inc., Costa Mesa, Calif.) is used. It will be appreciated also that a single SMA wire 18 may provide the displacing force, or if additional force is desired, multiple SMA wires 18 may be utilized in concert, such as by configuring in parallel or by braiding into an SMA "cable."

An electrical source 39 (depicted schematically in FIGS. 1 and 2) may be connected to wire 18 to provide a means for resistively heating wire 18, causing it to contract. A conduit 40 emanating from electrical source 38 may be directly connected to wire 18, such as by crimping or welding, or may be connected to retainer 21 such that contact between wire 18 and conduit 40 is maintained. In yet another embodiment (not shown), conduit 40 and wire 18 may be held together by a drop of solder, whereby the solder drop serves both to maintain electrical contact therebetween and provides the function of retainer 21.

Figure 2A:
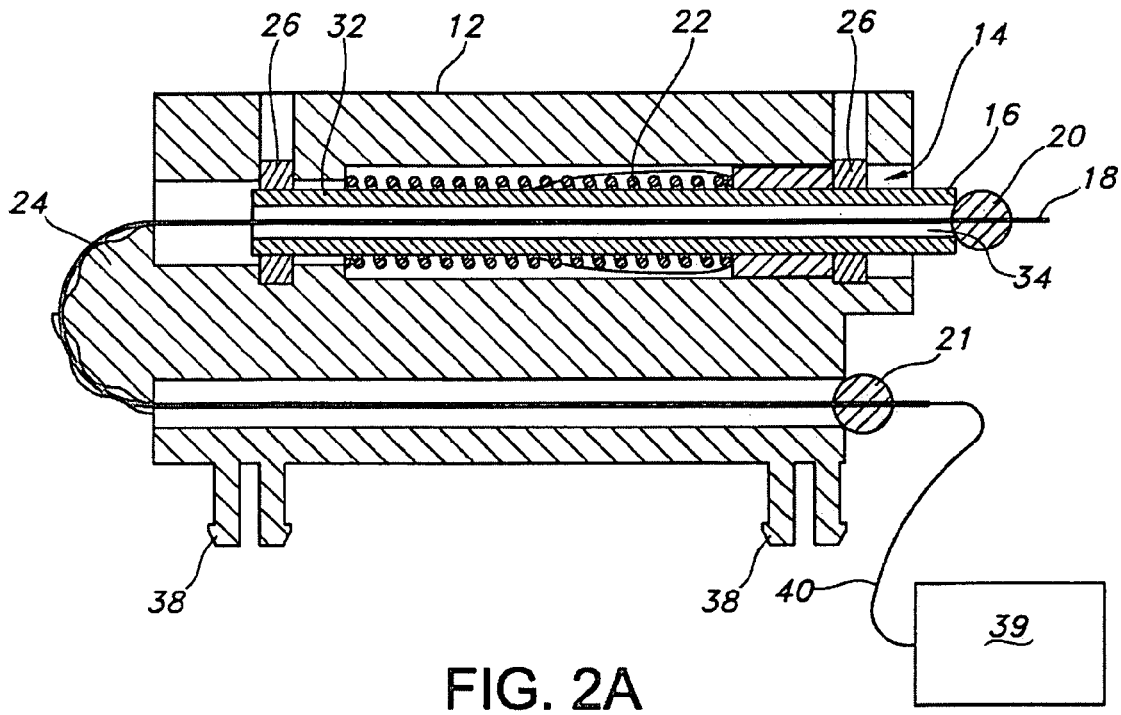
FIGS. 2*a*-2*b* are cross-sections of the actuator, showing the actuator in the resting (2*a*), and actuated (2*b*) positions.
Figure 2B:
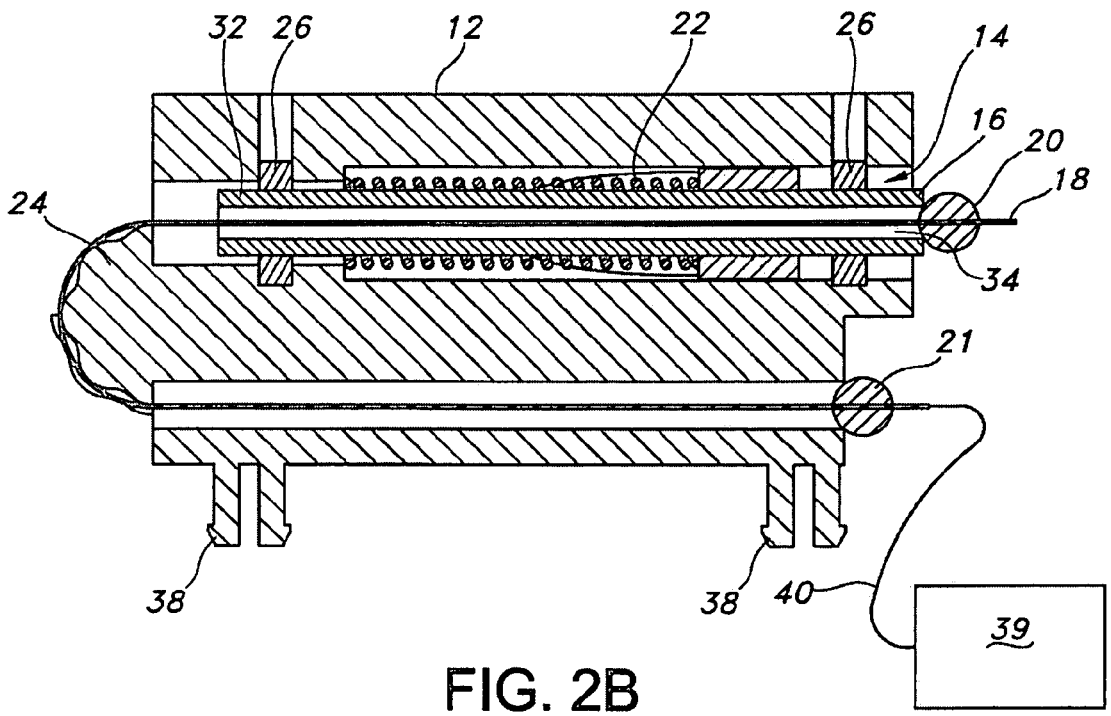
Figure 3:
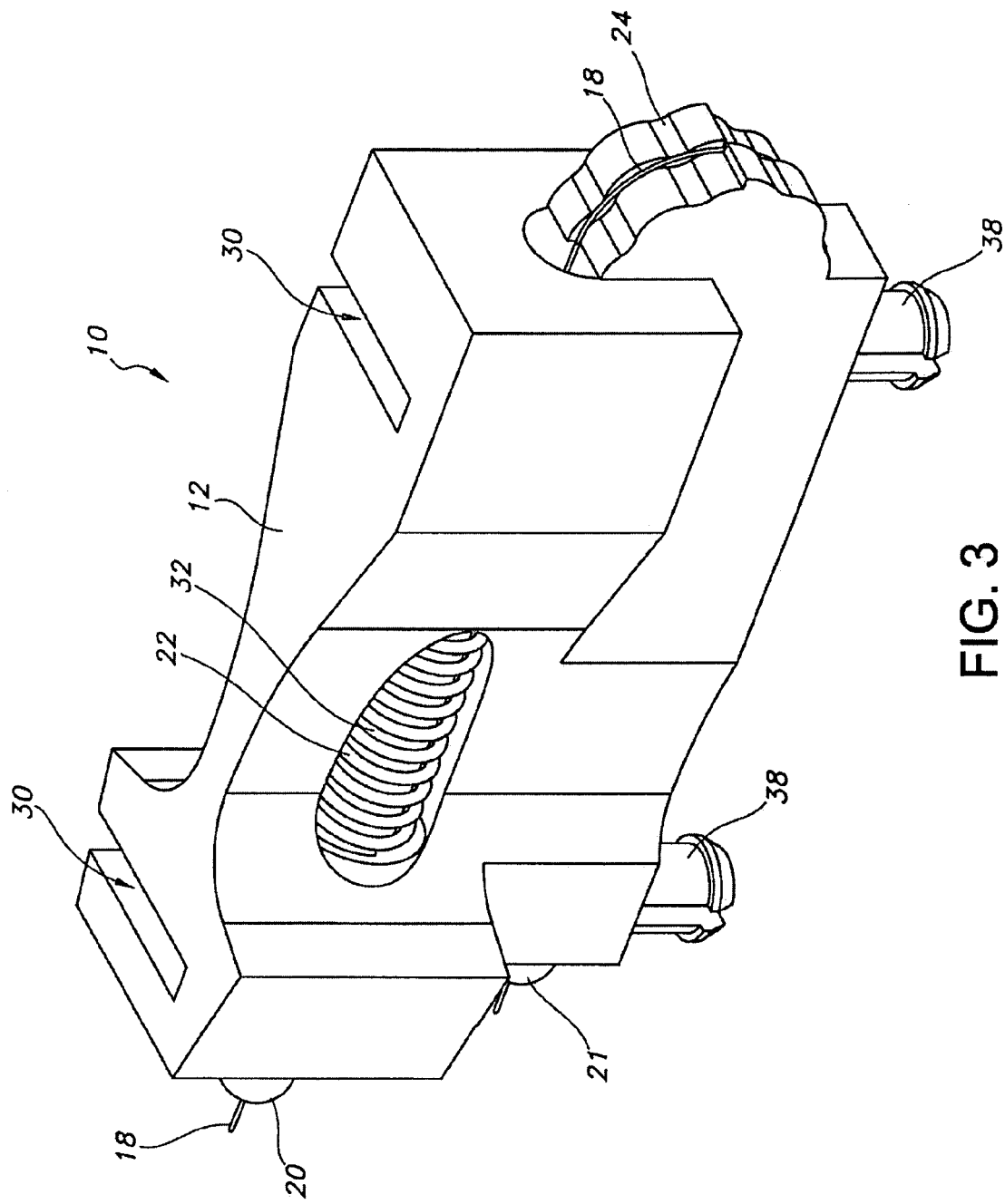
FIG. 3 is a rear elevational view of the actuator of the present invention, showing the wire guide.

It is known that unheated SMA alloy (the martensitic phase) may be placed under tension and elongated. FIG. 2a shows the actuator 10 of the present invention in the resting state, with wire 18 elongated and stop 16 extending from the housing 12. Upon application of an electric current, the wire 18 is resistively heated to the austenitic phase, and contracts, compressing spring 22 and retracting stop 16 into the interior of the housing 12 (FIG. 2b). Upon cooling, the biasing force applied by spring 22 elongates wire 18 to its previous length.

Figure 4:
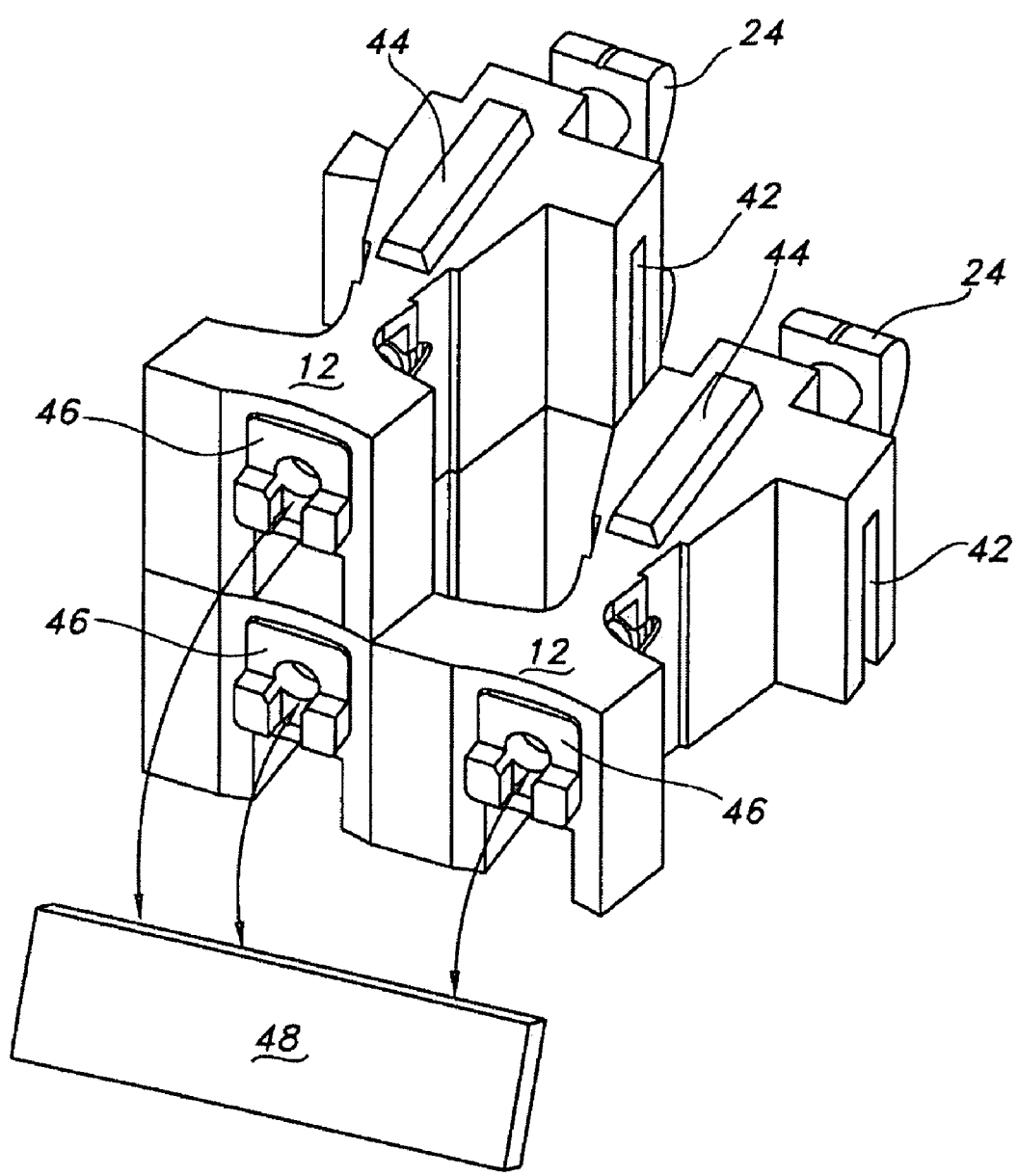
FIG. 4 shows a parallel orientation of three linear actuators, wherein the actuating force of each actuator is applied to a single plate.

As noted above, multiple SMA wires 18 may be used to increase the force generated by actuating the actuator 10 of the present invention. It is also possible to configure multiple actuators 10 in parallel to increase the force generated. As shown in FIG. 4, cooperating slots 42 and protrusions 44 may be provided on exterior surfaces of housings 12, thereby providing secure contact therebetween. Of course, supplemental means for improving the secure fastening of multiple actuators 10 may be employed, such as strong adhesives. In the embodiment shown in FIG. 4, a head 46 is provided in place of stop 16 as shown in FIGS. 1-2, to which a device to be displaced (not shown) is attached. A plate or bar 48 may be attached to heads 46. It will be appreciated that concurrently resistively heating wires 18 as described above will cause wires 18 to contract and draw heads 46 into housing 12, thereby moving plate 48 (and any device connected to plate 48) towards actuators 10, thereby significantly multiplying the force applied.

Figure 5A:
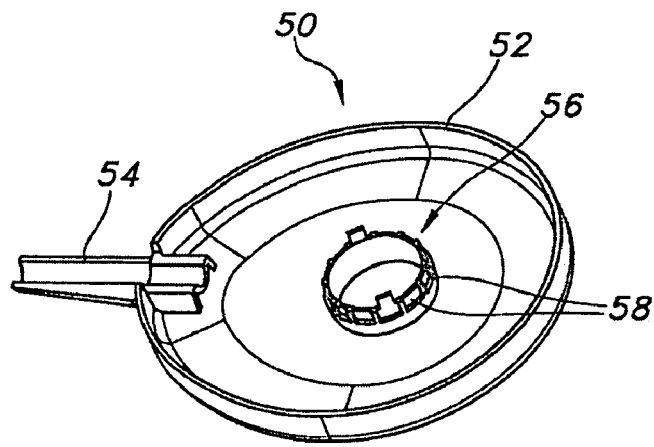
FIGS. 5*a*-5*c* depict a rotary or carousel dispenser (5*a*) using a serial configuration of two actuators to control rotational motion (5*b* and 5*c*).
Figure 5B:
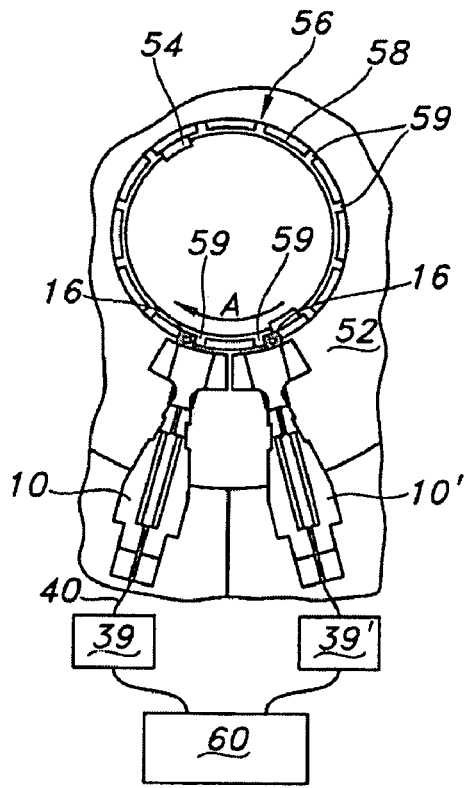
Figure 5C:
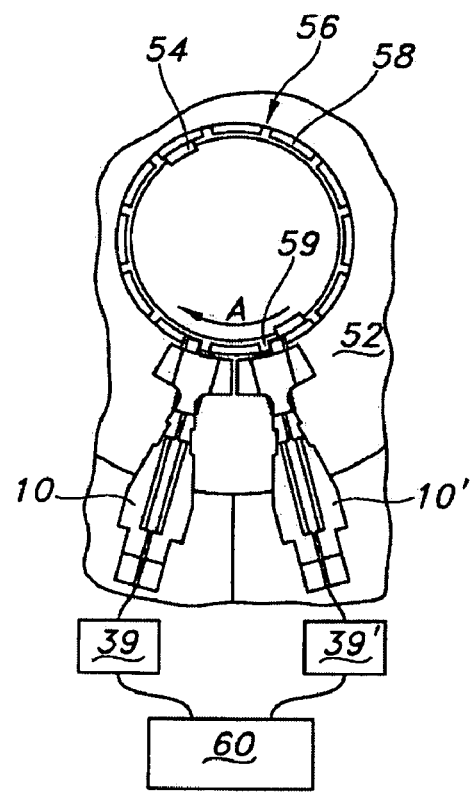

The actuator 10 of the present invention may also be used to control a rotary or carousel dispenser 50 as depicted in FIGS. 5a and 5b. Often, it is necessary to carefully control the amount of a substance dispensed. For example, as described in U.S. Pat. No. 6,610,271 to Wermeling for a System and Method for Intranasal Administration of Lorazepam (incorporated herein by reference), certain pharmaceuticals such as prescription opiates must be carefully controlled as to the amount and timing of dispensing to prevent overdosing and/or addiction. Single dose, metered dispensers such as those described in the '271 patent have been developed to address this issue. It is desirable to provide a dispenser which allows dispensing a desired dose of a substance such as a pharmaceutical at predetermined time intervals.

Accordingly, the actuator 10 of the present invention may be configured in a serial orientation to allow controlling a rotary dispenser. As shown in FIG. 5a, a carousel dispenser 50 is provided, having a body 52, a dispensing nozzle or channel 54, and a central hub 56. The body 52 is adapted to receive a plurality of vials (not shown for clarity) containing the substance to be dispensed. Central hub 56 includes a plurality of recesses 58 defining spaced side walls 59, which are configured to receive stops 16 of actuators 10. Referring to FIG. 5b, first and second actuators 10, 10' are attached to body 52 in a serial orientation, such that stops 16 are inserted into recesses 58, whereby contact between stop 16 of first actuator 10 and a wall 59 prevents rotation of the dispenser body 52. In this position, a metered dose of a desired substance has already been dispensed from a vial.

As described above, electrical sources 39, 39' are attached to wires 18 (not seen in this view) to resistively heat the wires. A microcontroller 60 of a type known in the art is provided to control electrical sources 39, allowing each to be activated at predetermined timed intervals. Electrical current is supplied to first actuator 10, thereby retracting stop 16 of first actuator 10. This allows the dispenser body 52 to rotate in the direction of arrow A. Dispenser body 52 continues its rotation until stop 16 of second actuator 10' contacts the next spaced side wall 59, moving dispenser nozzle 54 to the next available chamber holding a metered dose of the desired substance. When the next dose of substance is to be delivered, microcontroller 60 causes electrical source 39' to supply electrical current to second actuator 10', retracting stop 16 of second actuator 10' and again allowing rotation of dispenser body 52. By this time, wire 18 of first actuator 10 has cooled, and stop 16 thereof has returned to its original position whereby the next available spaced side wall 59 contacts stop 16, again stopping rotation of dispenser body 52. This sequential activation of first and second actuators 10,10' continues under the control of microcontroller 60 to deliver metered doses of substance at desired timed intervals.

Of course, rotation of dispenser body 52 may be accomplished manually. However, it is desirable to allow automated rotation of dispenser body 52. To accomplish this feature, any suitable means for applying continuous rotational force to dispenser body 52 may be utilized, such a coiled spring or a drive shaft (not shown). Application of continuous rotational force to dispenser body 52 ensures the rotation of the body 52 whenever the stop 16 of either first actuator 10 or second actuator 10' is actuated.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A linear actuator, comprising:
   a housing;
   a stop displaceable on a linear axis with respect to the housing;
   at least one wire formed of a shape-memory alloy, said wire attached at a first end to the stop and at a second end to the housing for applying a pulling force to the stop when heated to a predetermined temperature to cause the stop to slide in a first direction into a housing interior channel;
   a spring applying a biasing force to the stop in a second direction counter to the first direction;
   at least one jewel bearing defining a channel therethrough for slidingly receiving the wire and reducing frictional contact between the wire and the housing; and
   a wire heater.

2. The actuator of claim 1, wherein the housing further includes at least one curved wire guide.

3. The actuator of claim 1, wherein the jewel bearing is fabricated from any of the group consisting of ruby, sapphire, spinel, cubic zirconia, diamond, and any combination thereof.

4. The actuator of claim 1, further including a cylindrical shaft extending from the stop into the housing interior channel, the shaft defining a hollow interior adapted to receive the wire therethrough.

5. The actuator of claim 4, wherein the shaft is fabricated from any of the group of materials consisting of stainless steel, aluminum, magnesium, titanium, carbon steel, copper, nickel, carbon-fiber composite, and any combination thereof.

6. The actuator of claim 1, wherein the wire is fabricated from any of the group of shape memory alloys consisting of nickel-titanium, silver-cadmium, gold-cadmium, copper-aluminum-nickel, copper-tin, copper-zinc, copper-zinc-tin, copper-zinc-aluminum, copper-zinc-silica, indium-titanium, nickel-aluminum, iron-platinum, manganese-copper, iron-manganese-silica, and any combination thereof.

7. The actuator of claim 1, wherein the means for heating the wire is an electrical source for applying an electrical current to the wire.

8. The actuator of claim 1, wherein the housing includes cooperating slots and protrusions on an exterior surface thereof for connecting at least two actuators in parallel or in series.

9. An actuating device comprising:
   at least two linear actuators configured in a parallel orientation, wherein each actuator includes a housing having cooperating slots and protrusions on an exterior surface thereof for connecting the actuators, a stop displaceable on a linear axis with respect to the housing, at least one wire formed of a shape-memory alloy attached at a first end to the stop and at a second end to the housing for applying a pulling force to the stop when heated to a predetermined temperature to cause the stop to slide in a first direction into a housing interior channel, at least one jewel bearing defining a channel therethrough for slidingly receiving the wire and reducing frictional contact between the wire and the housing, and a spring applying a biasing force to the stop in a second direction counter to the first direction;
   a plate adapted for concurrently attaching to each actuator stop; and
   an electrical source for applying an electrical current to the wire of each actuator to cause the wire to heat to a predetermined temperature.

10. The actuating device of claim 9, wherein each actuator housing further includes at least one curved wire guide.

11. The actuating device of claim 9, wherein the jewel bearing is fabricated from any of the group consisting of ruby, sapphire, spinel, cubic zirconia, diamond, and any combination thereof.

12. The actuating device of claim 9, further including a cylindrical shaft extending from the stop into the housing interior channel, the shaft defining a hollow interior adapted to receive the wire therethrough.

13. The actuating device of claim 12, wherein the shaft is fabricated from any of the group of materials consisting of stainless steel, aluminum, magnesium, titanium, carbon steel, copper, nickel, carbon-fiber composite, and any combination thereof.

14. The actuating device of claim 9, wherein the wire is fabricated from any of the group of shape memory alloys consisting of nickel-titanium, silver-cadmium, gold-cadmium, copper-aluminum-nickel, copper-tin, copper-zinc, copper-zinc-tin, copper-zinc-aluminum, copper-zinc-silica, indium-titanium, nickel-aluminum, iron-platinum, manganese-copper, iron-manganese-silica, and any combination thereof.

15. An actuating device comprising:
   at least two linear actuators configured in a serial orientation, wherein each actuator includes a housing defining an interior channel, a stop displaceable on a linear axis with respect to the housing, at least one wire formed of a shape-memory alloy attached at a first end to the stop and at a second end to the housing for applying a pulling force to the stop when heated to a predetermined temperature to cause the stop to slide in a first direction into the housing interior channel, at least one jewel bearing defining a channel therethrough for slidingly receiving the wire and reducing frictional contact between the wire and the housing and a spring applying a biasing force to the stop in a second direction counter to the first direction;
   an electrical source for applying an electrical current to heat the wire of each actuator to a predetermined temperature; and
   a controller for causing the electrical source to apply current to predetermined individual applicator wires at predetermined timed intervals.

16. The actuating device of claim 15, wherein each actuator housing further includes at least one curved wire guide.

17. The actuating device of claim 15, wherein the jewel bearing is fabricated from any of the group consisting of ruby, sapphire, spinel, cubic zirconia, diamond, and any combination thereof.

18. The actuating device of claim 15, further including a cylindrical shaft extending from the stop into the housing interior channel, the shaft defining a hollow interior adapted to receive the wire therethrough.

19. The actuating device of claim 18, wherein the shaft is fabricated from any of the group of materials consisting of stainless steel, aluminum, magnesium, titanium, carbon steel, copper, nickel, carbon-fiber composite, and any combination thereof.

20. The actuating device of claim 15, wherein the wire is fabricated from any of the group of shape memory alloys consisting of nickel-titanium, silver-cadmium, gold-cadmium, copper-aluminum-nickel, copper-tin, copper-zinc, copper-zinc-tin, copper-zinc-aluminum, copper-zinc-silica, indium-titanium, nickel-aluminum, iron-platinum, manganese-copper, iron-manganese-silica, and any combination thereof.

21. The actuating device of claim 15, further including a rotary dispenser, the dispenser comprising:
   a bottom for receiving at least one vial for holding a substance to be dispensed;
   a dispensing nozzle;
   a central hub having a plurality of slots for receiving the actuator stops, thereby preventing rotation of the dispenser;
   means for rotating the dispenser when the stops are withdrawn from the central hub slots; and
   a top.

22. The actuating device of claim 21, wherein the means for rotating the dispenser is a coiled spring.

* * * * *